Sept. 1, 1959  R. W. POOLEY  2,901,774
PROCESS OF MAKING CELLULAR MATERIAL

Filed May 21, 1954  2 Sheets-Sheet 1

FORM SHAPABLE MIXTURE OF
VINYL RESIN,
PLASTICIZER (LIQUID),
BUNA N RUBBER,
CHEMICAL BLOWING AGENT, AND
VULCANIZING INGREDIENTS,
INCLUDING ULTRA ACCELERATOR

↓

SHAPE IN MINIATURE, AS BY EXTRUSION,
AT RELATIVELY LOW TEMPERATURE

↓

HEAT AT 300°F. OR HIGHER UNDER
CONDITIONS OF FREE EXPANSION
TO BLOW AND CURE

↓

FINISHED CLOSED-CELL
CELLULAR ARTICLE

*Fig. 1*

INVENTOR.
ROBERT W. POOLEY
BY
Robert J. Patterson
ATTORNEY

Sept. 1, 1959  R. W. POOLEY  2,901,774
PROCESS OF MAKING CELLULAR MATERIAL
Filed May 21, 1954  2 Sheets-Sheet 2
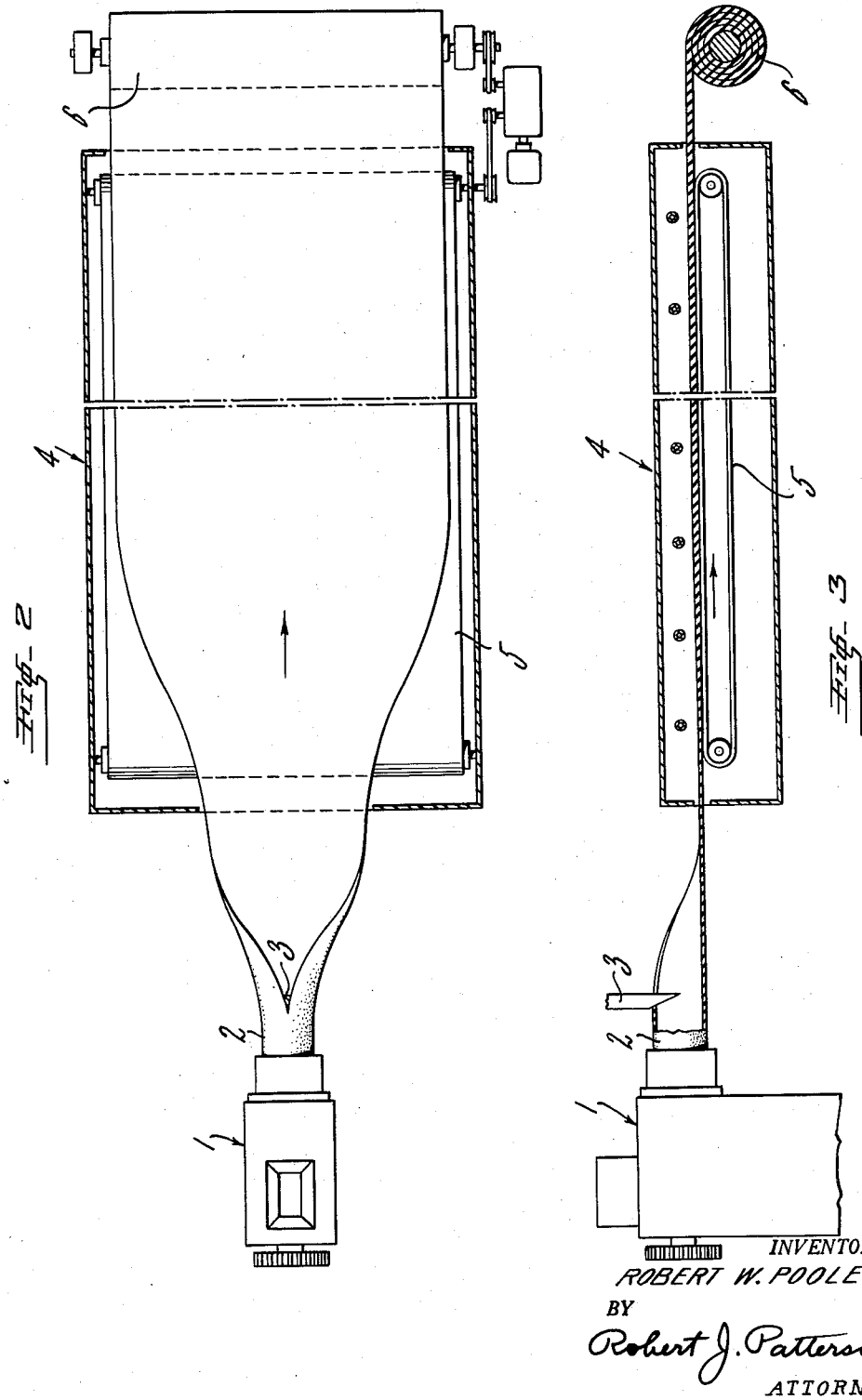
INVENTOR.
ROBERT W. POOLEY
BY
Robert J. Patterson
ATTORNEY United States Patent Office 2,901,774
Patented Sept. 1, 1959

2,901,774

PROCESS OF MAKING CELLULAR MATERIAL

Robert W. Pooley, South Bend, Ind., assignor to United States Rubber Company, New York, N.Y., a corporation of New Jersey Application May 21, 1954, Serial No. 431,460

3 Claims. (Cl. 18—53)

This invention relates to an improved process of making lightweight, closed-cell, cellular material composed essentially of a vulcanized, gas-expanded, homogeneous blend of a thermoplastic vinyl resin, a high-boiling organic liquid plasticizer for the vinyl resin, and a rubbery butadiene-acrylonitrile copolymer. The lightweight, cellular product of the present invention is substantially entirely of the closed-cell type, as is shown by the very low absorption of water when submerged therein for prolonged periods of time.

U.S. Patent to Daly et al. 2,570,182, issued October 9, 1951, describes a process of making cellular materials of the type produced by the present invention. The method of preparation described by Daly et al. involves dispersing at low temperature the solid vinyl resin and a high-boiling organic liquid plasticizer therefor in a rubbery butadiene-acrylonitrile copolymer as the continuous phase, including a chemical blowing agent and vulcanizing ingredients for the rubbery copolymer in the mixture, shaping the mixture and heating it to effect generation of gas by the blowing agent, expansion, fusion of the three principal components into a uniform, homogeneous blend, and vulcanization of the rubbery copolymer whereby a vulcanized closed-cell expanded product is obtained.

The expanding process which has been used commercially for making closed-cell material according to the Daly et al. patent has involved a rather elaborate and time-consuming procedure. In practice, the plastic, shapable mixture described in Daly et al. was charged into a suitable mold cavity representing a miniature of the final expanded shape, this mold cavity being substantially filled with the mixture. When flat stock was being made, the mold cavity was formed by a frame mold comprising a suitable confining frame placed between the platens of a suitable press. The mixture was then heated in the mold under pressure while rigidly confining it therein, to a temperature sufficiently elevated to decompose the blowing agent and generate the blowing gas which was confined in the mixture, to effect fusion of the three main components and to partially vulcanize the rubbery copolymer sufficiently to retain the evolved gas but insufficiently to prevent the desired subsequent expansion. The resulting shaped miniature article was then cooled in the mold after which it was removed therefrom and heated outside the mold to an elevated temperature. The Daly et al. patent states that the latter temperature should not be in excess of 250° F. This final heating step brings about expansion of the miniature shape to the final form and completes vulcanization of the rubbery copolymer.

Although the method just described has represented the best method known to those skilled in the art for making closed-cell materials of the type in question, it has been recognized that it is subject to serious disadvantages, the greatest of which is the long time of holding the mixture in the molding press during the pre-molding and during the subsequent cooling necessary to reduce the pressure of the gas so as to prevent violent expulsion of the gas from the mixture which would result in a worthless product. The long press cycle of heating and cooling contributes greatly to the high cost of producing materials of this type. It has been recognized that it would be necessary to obviate this long press cycle if this material was to be made cheaply enough to attain wide use.

In my copending United States application Serial No. 329,461, now Patent No. 2,757,147, filed January 2, 1953, I have described the preparation of a material of the type in question having remarkable shock absorbing characteristics by the use of specific relative proportions of vinyl resin, plasticizer and rubbery copolymer. The expansion method described in said application is essentially that described above except that the final expansion and vulcanization is carried out at temperatures of from 325 to 340° F. The method described in said application is subject to the same disadvantages referred to above.

The principal object of the present invention is to provide a more rapid and more economical method of preparing closed-cell vulcanized mixtures of vinyl resin, organic liquid plasticizer and rubbery butadiene-acrylonitrile copolymer. Another object is to provide a method which eliminates the long time of heating and cooling in the press during pre-molding of the mixture. Another object is to provide a process which allows unloading from a hot press and mold after the initial molding step whereby the time consumed in cooling of the press and mold prior to unloading and in subsequently re-heating the equipment before the next molding cycle is eliminated, thus effecting a considerable economic advantage over prior practice. Another object is to obviate the necessity for the pre-molding step in which the blowing agent is decomposed and in which partial vulcanization occurs while the mixture is confined under pressure. Another object is to provide a process in which the initial mixture can be shaped in miniature by simple use of pressure to mechanically knit the stock together, as by simple mechanical pressing (using a hydraulic press) or by means of an extruder of conventional type. Another object is to provide a method which lends itself nicely to continuous production. Numerous other objects will more fully hereinafter appear.

Fig. 1 is a self-explanatory flow sheet;

Fig. 2 is a plan view with portions broken away, of equipment for making flat stock continuously in accordance with my invention; and Fig. 3 is an elevation, with portions broken away, of the apparatus of Fig. 2.

I have discovered that the foregoing objectives can be accomplished in a commercially feasible manner by including in the initial unfused mixture (of particulate vinyl resin, liquid plasticizer, butadiene-acrylonitrile rubbery copolymer, and chemical blowing agent) a suitable amount of an ultra accelerator for vulcanization of the rubbery copolymer, shaping the resulting mixture in miniature under pressure sufficient to mechanically knit the stock together so that the miniature article will retain its shape upon removal from the shaping equipment and at a temperature which is below the decomposition temperature of the blowing agent so that no evolution of gas therefrom takes place, and then heating the resulting miniature shape at 300° F. or higher (but below the temperature of thermal injury to the material) under conditions permitting free expansion to decompose the blowing agent, expand the mixture to final form and effect cure of the rubbery copolymer.

The temperature in the shaping step will be between room temperature and 300° F. and more commonly will range from 150° F. upwardly to a point just short of that at which substantial decomposition of the blowing agent would occur.

By proceeding in the foregoing manner I am able, in the case of articles which are shaped in miniature under pressure in a mold, to unload the shaped miniature from a hot mold and to load a fresh charge into the hot mold. This constitutes a great economic advantage in that the time consumed in cooling of the press and mold prior to unloading and in subsequent re-heating of the equipment prior to the next miniature shaping is eliminated together with the waste of heat and complication of providing cooling means. By this method the press time per cycle can be reduced from about 60 minutes to about 20 minutes.

My invention can be practiced in two different ways, as follows:

EMBODIMENT WHEREIN NO CURE OF RUBBER COMPONENT OCCURS DURING INITIAL SHAPING

In this embodiment, I perform the initial shaping step under pressure at a temperature which is (1) below the fusion temperature of the mixture, i.e., below the temperature at which the rubber, resin and plasticizer merge or coalesce into a homogeneous single phase material, (2) below the decomposition temperature of the blowing agent, and (3) below the curing temperature of the elastomer in the mixture. The exact temperature used in this step will depend upon many factors including the pressure generated in the consolidating device and the plasticity of the stock. A temperature as low as room temperature can be used. Usually the temperature will be not less than about 150° F. and not over about 225° F. Shaping by extrusion has been successfully performed at 150–180° F. Press shaping, i.e., shaping in a mold such as a multi-part mold or a frame mold, often requires higher temperatures, e.g., 200–225° F.

When this embodiment is practiced the pressure necessary to achieve knitting of the mixture to form a shape which can be removed from the mold and further processed without loss of its shape can be obtained either in an extruder or by simple mechanical pressing (in a mold held closed by a hydraulic press or the like). The extruder is used for continuous articles of constant cross-section while the mold is used for shaped articles generally.

In this embodiment of my invention no substantial curing of the rubber takes place during the shaping step. The rubber is partially cured by the ultra accelerator in the initial portion of the final step (heating under conditions allowing free expansion), the ultra accelerator effecting sufficient cure of the rubber before or simultaneously with any substantial evolution of gas by the blowing agent so that all of the evolved gas is retained in the mass. Fusion of the rubber, resin and plasticizer into a single phase, curing of the rubber component and decomposition of the blowing agent all take place in the step of heating the shaped miniature under conditions of free expansion.

EMBODIMENT WHEREIN PARTIAL CURE OF RUBBER COMPONENT OCCURS DURING INITIAL SHAPING

In this embodiment I perform the initial shaping step at a temperature which is below the decomposition temperature of the blowing agent but is so high that partial curing of the rubber occurs as a result of action of the ultra accelerator upon the rubber. The shaping is usually done at a temperature substantially above 225° F., say 250° F., but substantially below 300° F. Temperatures in the range of 250–275° F. are best. To the best of my knowledge, little or no fusion of the resin with the rubber and plasticizer occurs during shaping at these temperatures. This embodiment of my invention can be practiced with a molding press with the same advantage as in the embodiment wherein no curing of the elastomer occurs during initial shaping, i.e., the shaped piece can be unloaded from the hot press without cooling, whereupon it is heated to 300° F. or higher to (1) decompose the blowing agent, the evolved gas being able to expand the partly cured mixture and being completely retained, (2) effect fusion of the rubber, resin and plasticizer into a single phase, and (3) complete vulcanization of the rubber, this occurring in such a way that the free expansion of the mixture by the evolved gas is not interfered with. This embodiment cannot be practiced with an extruder. When an extruder is used it is essential to extrude the mixture through the die before cure takes place; the stock will extrude rough if it is precured before exit from the die.

This embodiment of my invention cannot be used if decomposition of the blowing agent takes place during the shaping. As previously indicated, if the blowing agent decomposes and the shaped piece is taken from the mold while hot, it will immediately rupture upon release of confining or shaping pressure.

In this embodiment, I believe that no substantial curing of the rubber by the sulfur takes place until the final heating step for expansion to final form.

It is an easy matter to select chemical blowing agents having a decomposition temperature in the mixture of at least 300° F. and therefore adapted to use in my invention. Examples are dinitrosopentamethylenetetramine, diazoaminobenzene and alpha,alpha'azobisisobutyronitrile. In the embodiment of my invention first described above, wherein no curing takes place during shaping, an even wider selection of blowing agents is afforded, since it is only necessary that the blowing agent not decompose substantially at the shaping temperature.

It is to be emphasized that the initial shaping step is not an expanding operation and is not to be compared with the pre-molding step described in the above-mentioned Daly et al. patent. In my invention the principal purpose of this step is to consolidate the mixture, i.e., mechanically knit it together, and impart thereto in miniature the shape of the final article. As has been indicated, this initial shaping can be done in an ordinary extruder of the type conventionally used for rubber and plastic provided the extruder is capable of being so controlled that the temperature does not rise so high as to decompose the blowing agent or bring about substantial curing of the rubbery copolymer. Where an article having a shape not attainable by extrusion is desired or where it is desired to laminate stocks of different colors, the shaping of the mixture can be done in an ordinary multi-part mold held closed by a suitable press; in such case, pressing the mixture for five minutes at 200–225° F. is sufficient. Because no gas is generated from the blowing agent while the material is in the press, it is possible to load the press while it is hot. In addition, it is no longer necessary to cool the press down because there is no gas present in the mixture at the end of the shaping operation. It is only necessary to heat the press sufficiently to shape the mixture; thereafter, the press is opened and the shaped mixture is removed therefrom and subjected to expansion and curing as described above. The press is re-charged and the cycle repeated. True fusion of the elastomer, resin, and plasticizer takes place in the expansion step.

The shaping in miniature, whether done by extrusion or by press-molding, effects consolidation or coalescene of the resin, plasticizer and rubbery copolymer to a sufficient extent that the resulting miniature article holds its shape during handling and upon being expanded to final form, fusing and curing attains a final shape which accurately reproduces on a large scale the miniature shape.

My invention can be used for the manufacture of a very attractive multi-colored laminate by placing in a mold (preferably a so-called "frame mold" formed by an enclosing frame disposed between the heated platens of a press) a plurality of layers of differently colored stock substantially filling the mold, and subjecting the plied-up assembly to pressure and moderate heat to mechanically knit the stock in each layer together and to mechanically knit the adjacent layers together. The miniature laminate is then removed and heated under free expansion. This subject matter is described and claimed in my copending application, Serial No. 431,-479, now Patent No. 2,772,196, filed of even date herewith. The resulting laminate can be dried out to form shoe soles. If desired a tread design can be imparted to one side of the laminate by using a plate engraved with the tread design in miniature on one face of the plied-up assembly during the shaping step.

Alternatively, the differently colored stocks are sheeted out, as by extrusion, at temperatures below the decomposition temperature of the blowing agent and the resulting sheets are then plied-up and subjected to final heating under conditions of free expansion.

When the shaping in miniature is done in a mold, I substantially fill the mold with stock.

The use of a suitable amount of an ultra accelerator in the initial mixture is essential to successful operation of my invention. I use from 1 to 5 parts of ultra accelerator per 100 parts of rubbery copolymer. The preferred ultra accelerator is that known as "Butyl Eight" which is dibutyl ammonium dibutyl dithiocarbamate. I particularly prefer to use 2 parts of this ultra accelerator per 100 parts of rubbery copolymer. Examples of other ultra accelerators which can be used are tetrabutylthiuram monosulfide (such as that known as "Pentex"), zinc diethyl dithiocarbamate (sold under the trade-names "Ethazate" and "Ethyl Zimate"), copper dimethyl dithiocarbamate (e.g., "Cumate"), and zinc dimethyl dithiocarbamate (e.g., "Methazate"). The latter materials are well-known metal dialkyl dithiocarbamates. Any material known to be an ultra accelerator of the sulfur vulcanization of rubber can be used. The basis of my invention in the preferred embodiment wherein no substantial curing takes place in the initial shaping is that the ultra accelerator is substantially ineffective during the initial shaping but that it becomes effective when the shaped article is at the temperature of 300° F. or higher at which final expansion and curing are performed. Apparently the acceleration during heating to this expanding temperature is sufficiently rapid to effect, simultaneously with or slightly before decomposition of the blowing agent, cure of the rubbery copolymer to such an extent as to retain the gas as it is evolved so that a closed-cell or substantially closed-cell product is obtained.

In the other and less preferred embodiment of my invention, the ultra accelerator is effective to cause partial and limited cure during the shaping so that in the final heating the rubber is cured sufficiently to retain the gas evolved by the blowing agent but insufficiently to prevent expansion.

In both embodiments of my invention the ultra accelerator is effective to speed up final vulcanization of the rubber in the final heating and expanding step. However the final vulcanization should not be so rapid that the mixture cannot freely expand throughout evolution of the gas by the blowing agent; otherwise blowing efficiency is seriously reduced. Those skilled in the art will be readily able to compound mixtures operating perfectly in my invention.

It will be seen that my process represents a great advance over prior procedures which taught that it was essential to effect pre-curing and decomposition of the blowing agent in an initial high pressure molding step. The commercial advantages of my process are especially evident in the case where the initial shaping and consolidation is done in a simple extruding step.

In preparing the original mixture, I prefer to follow the teachings of the aforementioned Daly et al. patent, dispersing the vinyl resin and the liquid plasticizer in unfused condition in the rubbery copolymer as the continuous phase whereby a dry, shapable, non-sticky mixture is obtained. Conventional compounding ingredients for the resin and the rubbery copolymer are included. The usual amounts of vulcanizing materials for the rubbery copolymer are incorporated. Almost invariably sulfur is used as the vulcanizing agent, in conjunction with suitable levels of zinc oxide and stearic acid or the like. In some cases the only vulcanization accelerator included is the ultra accelerator which is generally incorporated just prior to use for the reason that if it is incorporated earlier it may cause substantial vulcanization of the rubber to occur while the mixture is being held, thereby interfering with or preventing the initial shaping or consolidation. Those skilled in the art will understand that some of the materials in the mixture may have an accelerating action incidental to their main function. For example certain vinyl resin stabilizers and the blowing agent known as "Unicel ND" (di-N-nitrosopentamethylenetetramine) exert an accelerating action but not enough to interfere with the operation of the process. The accelerating action of such materials can easily be taken into account by the compounder.

The vinyl resin will almost invariably be polyvinyl chloride or a resinous copolymer of a major proportion of vinyl chloride and a minor proportion of copolymerizable monomer containing an ethylenic group, e.g., vinyl acetate, vinylidene chloride, diethyl maleate, diethyl fumarate, etc. We prefer to use copolymers made from 85–95% vinyl chloride and 15–5% copolymerizable monomer. The vinyl resin should be completely compatible with the rubbery copolymer and it should be capable of being converted by the high-boiling organic liquid plasticizer, upon heating to an elevated temperature, i.e., 300° F. or higher, to a gel.

I can use any rubbery copolymer of butadiene and acrylonitrile. The combined acrylonitrile content generally ranges from 15 to 40%. Examples of suitable rubbery copolymers are those sold under the trade-name "Paracril." I have also successfully used the copolymers sold as "Hycar-OR" and "Chemigum."

Any high-boiling organic liquid plasticizer capable of dissolving the vinyl resin upon heating can be used. The plasticizer should be compatible with the rubbery copolymer. It usually is an ester, ether or ketone. Examples of suitable plasticizers are dioctyl phthalate, dibutyl sebacate, dioctyl sebacate, linear polyester resin plasticizers such as those disclosed in Ind. Eng. Chem., 37, 504 (1945), for example "Paraplex G-50," and plasticizers made by introducing epoxy groups into a drying oil, e.g., soy bean oil, an example of the latter type being "Paraplex G-60."

The relative proportions of resin, plasticizer and rubbery copolymer can vary widely. Typically I employ from 10 to 66% of the resin, from 10 to 60% of the plasticizer, and from 16 to 80% of rubbery polymer, these percentages being by weight based on the sum of these three ingredients alone and totalling 100%.

For certain uses, where unusually good shock absorbing properties are desired in the final article, I can proportion the resin, plasticizer and rubbery copolymer in accordance with my copending application Serial No. 329,461, filed January 2, 1953, which discloses and claims the attainment of unusual shock absorbing properties by the use of from 42 to 66% of the resin, from 14 to 20% of the plasticizer and from 20 to 38% of the copolymer.

The two principal methods of practicing my invention will now be summarized.

*Method wherein shaping is done by extrusion*

In this method the stock, which has been prepared in accordance with the principles given above, is extruded through any suitable type of extruder, either a plastic extruder or a so-called rubber tuber, in which conditions can be so controlled as to obtain consolidation of the mass into the extruded shape without any decomposition of the blowing agent or any substantial curing of the rubbery copolymer. The extruded shape may have any desired cross section. Thus it may be in the form of a solid rod or a channel of any desired shape. Alternatively, it may be in the form of a tubular article having any desired configuration such as circular or polygonal. The resulting extruded shape is then expanded and cured by heating at 300° F. or higher under conditions of free expansion as described above. The temperature in this step may range upwardly to that at which the stock would be injured by thermal decomposition. The resulting flexible rod, channel or pipe can be used in any suitable way. For example the tubular material could be used for insulating water pipes against freezing.

I have found that it is especially convenient to make flat stock using this extrusion method. I find that the initial mixture can be extruded in the form of a tube of any suitable diameter, e.g., using an ordinary inner tube extruding machine, and this tube can be slit longitudinally as by means of a knife suitably disposed to cut the stock as it emerges from the extruder, whereupon the resulting stock can be flattened out and passed in flattened condition through an air oven in which it is free to expand. Such a method lends itself readily to completely continuous operation, the flattened slit stock being fed continuously from the extruder onto a continuously operating belt conveying it through the oven. Soapstone or the like should be applied in any suitable way to the surface of the extruded stock in order to allow the flat stock to move freely on the belt in order to expand without being distorted. It will be understood that the stock expands in thickness, width and length. Usually it expands at least twice in each of the three dimensions.

The extrusion method is particularly adapted to fully continuous production of products having the same cross-section throughout their length.

The method just described is portrayed diagrammatically in Figs. 2 and 3 of the drawings wherein stock which has been prepared in the manner described above is fed into a conventional extruder 1 (such as an inner tube extruder) which continuously extrudes the stock in the form of a hollow tube 2. Knife 3 slits the tube 2 as it leaves the extruder and the stock is then flattened out and fed through hot air oven 4 which can be of any suitable length, by means of endless belt 5. The stock may be soapstoned or talced on both sides before it contacts belt 5 in order to prevent adhesion and thus allow the stock to move freely on the surface of belt 5 as it expands laterally and longitudinally. The expanded flat stock leaves oven 4 and is wound up on roll 6.

*Method wherein article is shaped in mold*

In this method, which is used in making articles having a special configuration which could not be made by expansion of an extruded mixture, the original mixture is simply charged into a mold operating at a temperature below that at which substantial decomposition of the blowing agent would occur, and is shaped therein under pressure for a time just sufficient to cause cohesion of the mixture in self-supporting form, whereupon the shaped article is removed from the mold and expanded and cured by heating at 300° F. or higher under conditions of free expansion.

The following examples illustrate my invention more fully:

EXAMPLE 1

The following formulation was used:

| | Parts by weight |
|---|---|
| "Vinylite VYNW" (copolymer of 95% vinyl chloride and 5% vinyl acetate) | 100 |
| Dioctyl phthalate (plasticizer) | 40 |
| Dibutyl sebacate (plasticizer) | 20 |
| Antimony oxide | 20 |
| "Unicel ND" (dinitrosopentamethylenetetramine) | 50 |
| Stabilizer for vinyl resin | 6 |
| Calcium stearate | 4 |
| Stearic acid | 1 |
| Zinc oxide | 5 |
| Sulfur | 1 |
| Salicylic acid | 1 |
| Coloring agents | 2.5 |
| "Hycar OR-15" (butadiene-acrylonitrile rubbery copolymer) | 100 |
| "Agerite Stalite" (mono- and diheptylated diphenylamines) | 1 |
| "Butyl Eight" (dibutyl ammonium dibutyl dithiocarbamate) | 2 |

All of the above ingredients except the two plasticizers, the "Hycar," the "Agerite Stalite" and the "Butyl Eight" were dry blended in a Hobart mixer to a uniform mixture. The two plasticizers were then added to this dry mixture and intimately incorporated therewith. The "Hycar" was banded on a cold rubber mill whereupon the "Agerite Stalite" was incorporated therewith on the cold mill after which the uniform blend which was made in the Hobart mixer was incorporated with the "Hycar"-"Agerite Stalite" mixture on the cold mill. Milling was continued until a homogeneous dispersion was obtained. Care was taken to keep the temperature of the mixture below 180° F. to avoid fusion of the mixture and decomposition of the blowing agent. The mixture at this point contained the rubbery copolymer in the continuous phase with the resin, plasticizer and other ingredients in the discontinuous phase. Immediately prior to use, the mixture was placed on a cold mill and the "Butyl Eight" was intimately incorporated therewith. The resulting mixture was readily converted to closed-cell, expanded, vulcanized form in the ways described above. Typically the product from this example has a low density (4 to 5 lbs. per cubic foot) and low compressive resistance (1.5 to 2.0 pounds per square inch) at 25% deflection.

EXAMPLE 2

The following formulation was used:

| | Parts by weight |
|---|---|
| "Vinylite VYNW" | 140 |
| Dioctyl phthalate | 40 |
| "Unicel ND" | 36 |
| Coumarone-idene resin | 10 |
| 2,5-di-tertiary butyl meta-cresol | 10 |
| Antimony oxide | 20 |
| Titanium dioxide | 20 |
| Calcium silicate | 10 |
| Zinc oxide | 6 |
| Calcium stearate | 6 |
| Stabilizer for vinyl resin | 12 |
| Stearic acid | 2 |
| Salicylic acid | 2 |
| Benzothiazyl disulfide | 1 |
| Sulfur | 4 |
| "Paracril C" (rubbery butadiene-acrylonitrile copolymer, about 35% acrylonitrile) | 100 |
| "Butyl Eight" | 2 |

These ingredients were blended in the same way as described above for Example 1. The resulting mixture was then converted to closed-cell, expanded, vulcanized form in the ways described above. Excellent results were obtained. The resulting products were considerably more firm than the products obtained in Example 1 and had much better shock absorbing properties than those products.

If the ultra accelerator were omitted from the mixture, the expanded products obtained would be coarse and would have too many open or inter-communicating cells to be useful for the purposes to which the products of my invention are applicable. My products have very good heat insulating properties and excellent moisture resistance. They can be used for shock absorbing, for manufacture of insulated clothing for use in extremely cold climates, as a buoyancy material, etc. The density of the products of my invention is usually not over 10 pounds per cubic foot and often ranges from 5 to 8 pounds per cubic foot. The compressive resistance of my products is usually at least 0.8 pound per square inch at 25% compression and is often considerably higher than this ranging up to 20 pounds per square inch or to an even higher figure. My products have a water absorption figure of less than 10% of their weight when submerged in water for 72 hours. The firmness or compressive resistance of the product can be controlled by varying the relative proportions of the three principal components and can be controlled to some extent by varying the amount of ultra accelerator used.

From the foregoing description it will be seen that the present invention constitutes a major advance in the art because it greatly simplifies the manufacture of closed-cell, flexible material of the type in question. By obviating the need for the pre-molding step wherein the blowing agent is decomposed, which step has been heretofore deemed indispensable, the present invention greatly speeds up the productivity of given molding and expanding equipment. The present invention is especially advantageous because it makes it possible to use simple extrusion to effect consolidation of the mixture preparatory to the free expansion and curing. The present invention is particularly advantageous when it is used to make flat stock continuously in the manner shown in Figs. 2 and 3 of the drawings.

Having thus described my invention, what I claim and desire to protect by Letters Patent is:

1. The process of producing a lightweight, closed-cell cellular material in a definite desired shape which comprises forming a plastic, shapable mixture comprising from 10 to 66% by weight of a thermoplastic vinyl resin, from 10 to 60% of a plasticizer therefor, and from 16 to 80% of a rubbery butadiene-acrylonitrile copolymer, said percentages totally 100%, a chemical blowing agent having a decomposition temperature of at least 300° F., which temperature is above the temperature used in the hereinafter-mentioned shaping step, and vulcanizing ingredients for said rubbery copolymer, said vulcanizing ingredients comprising from 2 to 5 parts of ultra-accelerator per 100 parts of said copolymer, shaping this mixture in the form of a miniature of the said finally desired shape at a temperature substantially below 300° F., said temperature being below that at which substantial decomposition of the blowing agent or vulcanization of the copolymer occur, thereby effecting consolidation of the mixture and knitting together of the components of the mixture into a unitary, self-supporting, shape-retaining, unvulcanized mass which is a miniature of the desired shape and which still contains the blowing agent in an undecomposed state, and thereafter heating the resulting miniature at a vulcanizing temperature of 300° F. under conditions of free expansion to decompose said blowing agent and vulcanize said copolymer in a single heating step, whereby there is formed an expanded closed-cell vulcanized mass having the said finally desired shape.

2. The process of producing a lightweight, closed-cell cellular material in a definite desired shape which comprises forming a plastic, shapable mixture comprising from 10 to 66% by weight of a thermoplastic vinyl resin, from 10 to 60% of a plasticizer therefor, and from 16 to 80% of a rubbery butadiene-acrylonitrile copolymer, said percentages totalling 100%, a chemical blowing agent having a decomposition temperature of at least 300° F., which temperature is above the temperature used in the hereinafter-mentioned shaping step, and vulcanizing ingredients for said rubbery copolymer, said vulcanizing ingredients comprising from 2 to 5 parts of ultra-accelerator per 100 parts of said copolymer, shaping this mixture in the form of a miniature of the said finally desired shape at a temperature of from 150° to 225° F., said temperature being below that at which substantial decomposition of said blowing agent or vulcanization of said copolymer occur, thereby effecting consolidation of the mixture and knitting together of the components of the mixture into a unitary, self-supporting, shape-retaining, unvulcanized mass which is a miniature of the desired shape and which still contains the blowing agent in an undecomposed state, and thereafter heating the resulting miniature shape at a vulcanizing temperature of 300° F. under conditions of free expansion to decompose said blowing agent and also vulcanize said copolymer during the said heating operation, whereby there is formed an expanded closed-cell vulcanized mass which is a miniature of the desired shape 3. The process of producing a lightweight, closed-cell cellular material in a definite desired shape which comprises forming a plastic, shapable mixture comprising from 10 to 66% by weight of a thermoplastic vinyl resin, from 10 to 66% of a plasticizer therefor, and from 16 to 80% of a rubbery butadiene-acrylonitrile copolymer, said percentages totalling 100%, a chemical blowing agent having a decomposition temperature of at least 300° F., which temperature is above the temperature used in the hereinafter-mentioned extrusion step, and vulcanizing ingredients for said rubbery copolymer, said vulcanizing ingredients comprising 2 to 5 parts of ultra-accelerator per 100 parts of said copolymer, extruding said mixture to form a miniature of the said finally desired shape, the said extruding step being carried out while the mixture is at a temperature of from room temperature to 225° F., said temperature being below that at which any substantial decomposition of said blowing agent or vulcanization of said copolymer occur, thereby effecting consolidation of the mixture and knitting together of the components of the mixture into a unitary, self-supporting, shape-retaining, unvulcanized mass which is a miniature of the desired shape and which still contains the blowing agent in an undecomposed state, and thereafter heating the resulting extruded miniature shape at a vulcanizing temperature of 300° F. under conditions of free expansion to decompose said blowing agent and vulcanize said copolymer in a single heating operation, whereby there is formed an expanded closed-cell vulcanized mass having the said finally desired shape.

References Cited in the file of this patent
UNITED STATES PATENTS

| | | |
|---|---|---|
| 2,177,660 | Kimble et al. | Oct. 31, 1939 |
| 2,291,213 | Cuthbertson | July 28, 1942 |
| 2,299,593 | Roberts et al. | Oct. 20, 1942 |
| 2,315,366 | Daley et al. | Mar. 30, 1943 |
| 2,325,903 | Blair et al. | Aug. 3, 1943 |
| 2,405,345 | Cooper | Aug. 6, 1946 |
| 2,484,397 | Barton | Oct. 11, 1949 |
| 2,570,182 | Daley et al. | Oct. 9, 1951 |